United States Patent [19]
Wirz et al.

[11] Patent Number: 5,649,670
[45] Date of Patent: Jul. 22, 1997

[54] DAMPING ARRANGEMENT FOR A CHUCK OF A SPOOLING MACHINE

[75] Inventors: Armin Wirz, Ossingen; Peter Busenhart, Wiesendangen, both of Switzerland

[73] Assignee: Rieter Machine Works, Ltd., Winterthur, Switzerland

[21] Appl. No.: 382,026

[22] PCT Filed: Jun. 24, 1994

[86] PCT No.: PCT/CH94/00131

§ 371 Date: Feb. 9, 1995

§ 102(e) Date: Feb. 9, 1995

[87] PCT Pub. No.: WO95/01516

PCT Pub. Date: Jan. 12, 1995

[30] Foreign Application Priority Data

Jul. 2, 1993 [CH] Switzerland ................ 1992/93

[51] Int. Cl.⁶ .............. B65H 75/30; B65H 54/00; F16C 27/00
[52] U.S. Cl. .............. 242/46.2; 242/18 R; 384/99
[58] Field of Search ................ 242/18 R, 18 DD, 242/46.2, 46.4; 384/99, 537, 535, 581

[56] References Cited

U.S. PATENT DOCUMENTS

| | | |
|---|---|---|
| 2,155,919 | 4/1939 | Wooler . |
| 3,844,630 | 10/1974 | Lechner ................ 384/99 |
| 3,917,182 | 11/1975 | Lenk ................ 242/18 R |
| 4,440,456 | 4/1984 | Klusman ................ 384/99 X |
| 4,668,105 | 5/1987 | Furukawa et al. ................ 384/99 |
| 4,669,893 | 6/1987 | Chalaire ................ 384/99 |
| 4,687,346 | 8/1987 | Suciu ................ 384/99 |
| 4,852,819 | 8/1989 | Hasegawa et al. ................ 242/46.2 X |
| 4,952,076 | 8/1990 | Wiley, III et al. ................ 384/99 |
| 4,953,802 | 9/1990 | Busenhart et al. ................ 242/46.2 |
| 4,983,051 | 1/1991 | Hibner et al. ................ 384/99 |
| 5,159,166 | 10/1992 | Arnosti ................ 219/10.492 |
| 5,452,957 | 9/1995 | Duggan ................ 384/99 |

FOREIGN PATENT DOCUMENTS

| | | |
|---|---|---|
| 0094483 | 11/1983 | European Pat. Off. . |
| 0217276 | 4/1987 | European Pat. Off. . |
| 0272458 | 8/1991 | European Pat. Off. . |
| 1562479 | 4/1969 | France . |
| 2664620 | 1/1992 | France . |
| 4240920 | 6/1993 | Germany . |

*Primary Examiner*—Michael Mansen
*Attorney, Agent, or Firm*—McAulay Fisher Nissen Goldberg & Kiel, LLP

[57] ABSTRACT

The axle of a chuck for a spooling machine is mounted in a damped manner within a fixed casing. The axle is rotatably supported in bearings which, in turn, are mounted in annular carriers which are spaced from the casing by a small annular gap. The carriers are supported by resilient pins in elements which serve to mount the bearings in place. In addition, a damping liquid, such as oil, is introduced in to the gap between each carrier and the casing to damp oscillations transmitted from the axle. In one embodiment, a hollow ring filled with damping liquid may be used to center the bearing and to damp the oscillations.

7 Claims, 3 Drawing Sheets

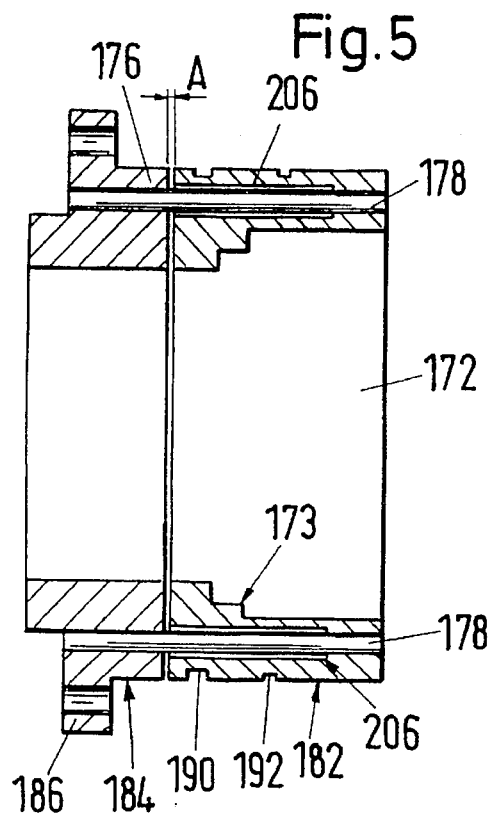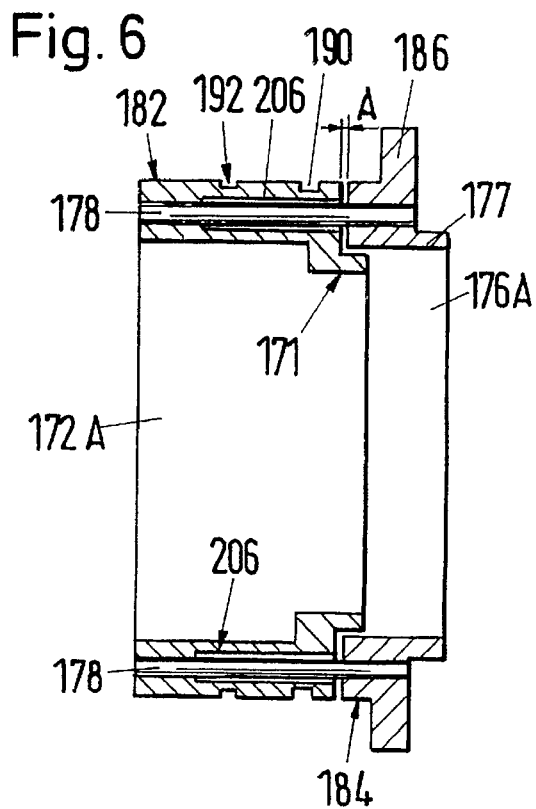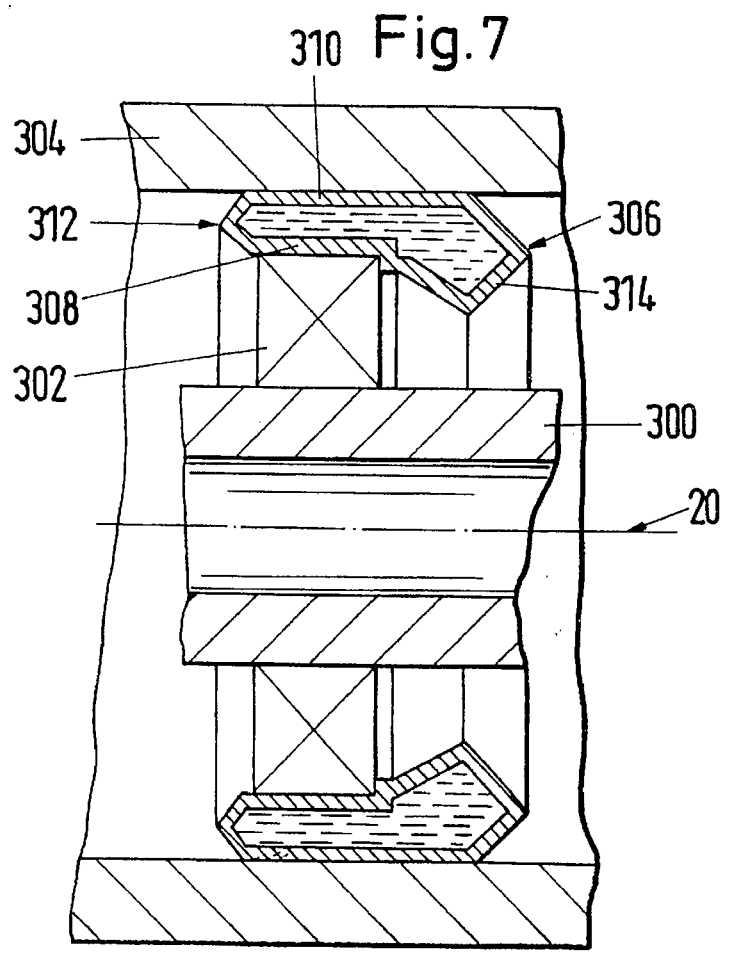

DAMPING ARRANGEMENT FOR A CHUCK OF A SPOOLING MACHINE

The invention relates to a damping means for damping vibrations which may arise during the operation of a fast-rotating axle (e.g., of a chuck) in a filament spooling machine.

Damping means for a fast-rotating axle (of a gas turbine, for example) have been described in U.S. Pat. No. 4,669,893. A special application of damping means in drafting rollers for filament processing has been outlined in U.S. Pat. No. 5,159,166. A damping for a spooling machine has been shown in DE-A-42 40 920.

A chuck principally differs from a drafting roller in that a relatively long rotatable element is cantilever-mounted and that during operation it has to withstand a considerable growth in weight in the cantilever-mounted portion owing to the building of the bobbin. This problem has been described in detail in U.S. Pat. No. 3,917,182 (=DE-A 22 61 709). The solution proposed therein aims at reducing the critical speed of the arrangement in such a way that it is clearly below the operating range. In accordance with this proposal, one strives to influence the natural resonance of the arrangement. Respective means have been-shown in EP-A-234 844 (see, in particular, FIG. 8).

A chuck also differs from the drafting roller in that the external diameter of the rotatable element plays a critical role in the overall arrangement. The mantle surface of the chuck must receive bobbin tubes which are usually standardized. An increase of the diameter (so as to increase the stiffness) reduces the quantity of a given yarn which could be wound up on the bobbin. A shortening of the chuck (for the same purpose) has a similar effect.

Another difference between a chuck and a drafting roller is that the chuck cannot necessarily be designed anew for coping with higher speeds. On the contrary, it has to be adapted to many requirements of practical operation. In extending the field of application of a given chuck (e.g., in accordance with EP-A 217 276), one very quickly enters the resonance range of the second critical speed.

Contrary to the doctrine in accordance with U.S. Pat. No. 3,917,182, the present invention does not try to displace the resonance range by changing the design, but tries to dampen the oscillations in such a way that no substantial damage can occur thereby.

For this purpose the invention provides a damping for a fast-rotating axle (in particular a chuck) in a spooling machine which comprises a centering means so as to center the axle with respect to a fixing device, whereby a narrow annular space is formed, in which space there is provided a damping means encircling the axle.

The centering means is preferably arranged in such a way that it can exercise its function also in the event of cantilever mounting and of considerable changes in weight (e.g., during the formation of a docking) in the cantilever-mounted portion. This functions consists, in particular, of preventing any sagging from the cantilever-mounted portion or of keeping it within narrow limits. The centering means, however, enables the transmission of oscillations from the rotating axle to the damping means.

The damping means may comprise a liquid, i.e. be hydraulic. A supply of liquid can be provided so as to compensate for any losses during operation. In this case it is possible to provide a separate centering means. It is possible, for example, to provide spring elements for supporting a bearing for the axle with respect to an encasing. The damping liquid, however, could also be provided in a closed elastic container. In this case the container can be used as centering means.

Examples of these modifications are explained below in closer detail by reference to the enclosed drawings, in which:

FIG. 5 illustrates a cross sectional view of a damping means constructed in accordance with the invention;

FIG. 6 illustrates a view of a further damping means constructed in accordance with the invention; and FIG. 7 illustrates a cross sectional view of a modified bearing and damping means arrangement in accordance with the invention.

Figure 1:
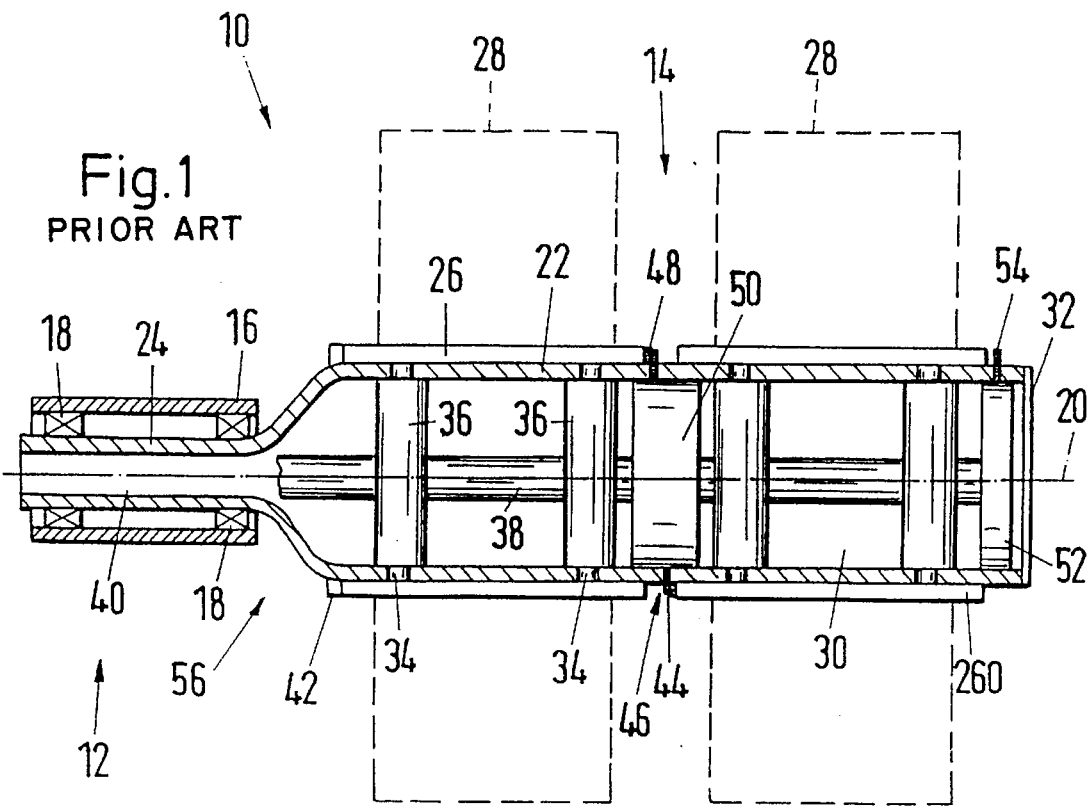
FIG. 1 illustrates a cross sectional view of a chuck in accordance with the prior art illustrated in FIG. 1 of EP-A-217276.

The chuck 10 shown in FIG. 1 comprises a bearing portion 12 and an extension arm portion 14. The bearing portion 12 comprises a solid casing 16 which encompasses bearings 18 defining an axis of rotation 20. The rotatable structure of the chuck 10 comprises a single integral load-bearing element (made from one part) which consists Of a first tube-like part 22 in the extension arm portion 14 and of a second tube-like part 24 which extends from the first part 22 into the bearing portion 12 in order to be carried by the bearings disposed therein.

The outer surface of the tube-like part 22 is cylindrical, and the diameter of the cross section is selected in such a way that the chuck can receive and carry bobbin tubes indicated by the broken lines 26, 260. These tubes are usually Specified by the final users of the machines. They should be provided with a smooth inner surface so as to allow a sliding creeling of the tubes on the cylindrical outer surface of portion 22 and a doffing of the full yarn packages formed thereon and indicated by the broken lines 28.

To simplify the representation, FIG. 1 shows a chuck which is arranged to carry two bobbin tubes during operation so as to wind up two packages from two supplied yarns. The chuck is cantilever-mounted and the bobbin tubes are "creeled" owing to their movement axially along the chuck. When the chuck is ready for operation it therefore carries an "inner" bobbin tube 26 (near the carrier of the chuck) and an "outer" bobbin tube 260 (near the free end of the chuck). The invention is not limited to the use with two bobbin tubes.

The hollow interior of the tube-like portion 22 defines a chamber 30 extending axially over nearly the whole length of portion 22 and opening at the free end of the chuck. The chamber is closed in operation by a cap 32 which is attached by any suitable means (not shown) on portion 22. Apparatuses for attaching and centering every bobbin tube 26 with respect to the tube-like portion 22 are arranged within the chamber 32. These apparatuses are indicated only schematically in form of blocks in FIG. 2; suitable embodiments of such apparatuses are shown in EP-A-217 276.

If the inner apparatus (i.e., the apparatus nearest to the bearing zone 12) were taken as an example, the apparatus comprises a plurality of tube-grasping elements 34 which pass through respective openings in portion 22. These openings are arranged evenly about axis 20. There are usually six or eight of such openings with the same number of tube-grasping elements. The elements are radially movable between retracted positions in which they do not disturb the creeling and doffing of the bobbin tubes and extended positions in which they secure the respective bobbin tube with respect to part 22.

For every bobbin tube there are two sets of elements 34. For every set of elements 34 there is one respective movement means, with the inner movement means being indicated by reference numeral 36. Every movement means is operated so as to move the elements 34 of the associated set from the retracted to the extended position and to enable the return of the elements into the retracted position. The movement means are selectively operable by a power supply means which is generally indicated by reference numeral 38 and extends axially along the central portion of chamber 30. The connection to the power supply means 38 can be produced by a passage 40 which extends axially to the tube-like part 24.

The correct axial position of the inner bobbin tube with respect to the tube-like part 22 is ensured by an axial detent 42 which sits close to the inner end of part 22. The inner bobbin tube can be pushed along portion 22 up to detent 42. The correct position of the outer bobbin tube 260 is ensured by a positioning element 44 which projects through a matching opening in portion 22 after the creeling of the inner bobbin tube 26. When it has been moved to its extended position, the element 44 acts on a detent which limits the movement of the outer tube 260 to the inner part of part 22.

As is shown in FIG. 1, the arrangement is made in such a way that a gap 46 is left between the close-lying ends of the correctly positioned tubes 26, 260. A catch and separating element 48 can be moved after the creeling of the tubes into said gap. The elements 44 and 48 are carried by a common back-up ring 50 within the tube-like part 22. A suitable form of ring 50 is described herein below.

A ring 52, which is similar to ring 50, is provided in such a way that it sits close to the outer end of the outer tube 260. Ring 52, however, only carries the yarn catch and separating elements 54, as the tube lying outside is positioned axially by the element 44 at its inner end.

The components arranged within the tube-like portion 22 are mounted by insertion through the open free end of the tube-like portion, which thereafter is closed by cap 32.

Figure 2:
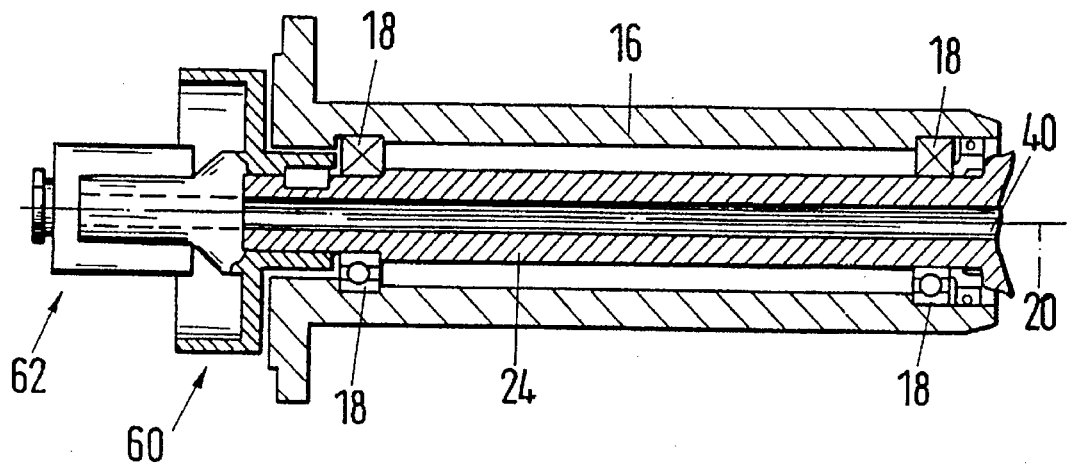
FIG. 2 illustrates a part cross sectional view of a modified chuck of the prior art as shown in FIG. 2 of EP-A-217276.

FIG. 2 shows the bearing portion 12 of the chuck in accordance with FIG. 1, but with additional details of a practical embodiment. The support casing is indicated by reference numeral 16 and the bearings with reference numeral 18. The portion of the rotatable structure with the smaller diameter is indicated with reference numeral 24 and the axial bore therein is indicated with reference numeral 40.

A brake and drive unit 60 is attached to portion 24 on its end remote from portion 22. This unit is common and shall not be explained herein in detail. The unit provides a coupling 62, by means of which the liquid pressure agent can be guided into the interior of passage 40.

Figure 3:
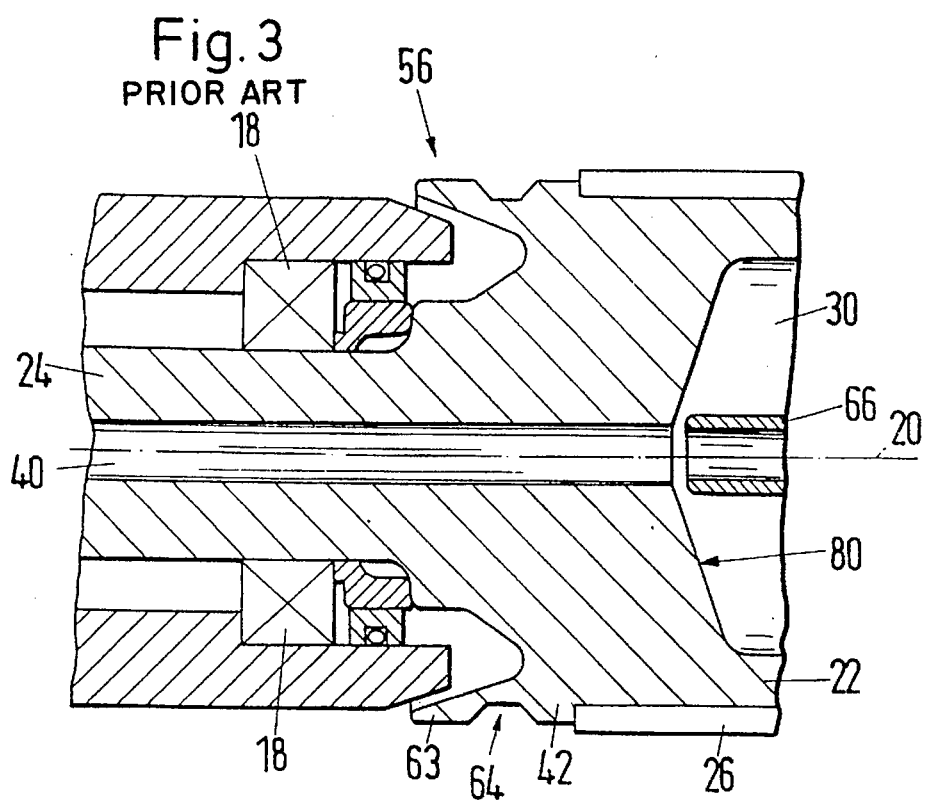
FIG. 3 illustrates a cross sectional view of a bearing mounting with a damping means in accordance with the prior art shown in FIG. 3 of EP-A-217276.

FIG. 3 shows further details of the connecting zone 56 in greater detail. FIG. 3 shows in particular that the inner end of chamber 30 can be brought very close to the outer bearing 18. A suitable taper is provided between the outer diameter of portion 22 (defined by the relationship to the bobbin tubes to be used) and the outer diameter of portion 24 (defined by the structure of bearing portion 12). The detent 42 forms a projection on said taper and borders in this embodiment on a further projection 63 which enables the provision of a catch thread notch 64. In the event that any yarn winding goes beyond the inner end of the inner bobbin tube 26, it is held back by said notch 64. As is also shown in FIG. 3, the outer end of passage 40 is connected to an inner end of a tube 66 which extends axially along the central portion of chamber 30.

The chuck in accordance with FIGS. 1 to 3 provides a very sturdy and stable arrangement which can be implemented relatively free from problems of balance errors. Nevertheless, any planned extension of the field of application (speed ranges) will lead to resonance problems which are linked to the so-called critical speeds. To solve such problems the invention provides a damping means which will now be outlined by reference to the other Figures.

Figure 4:
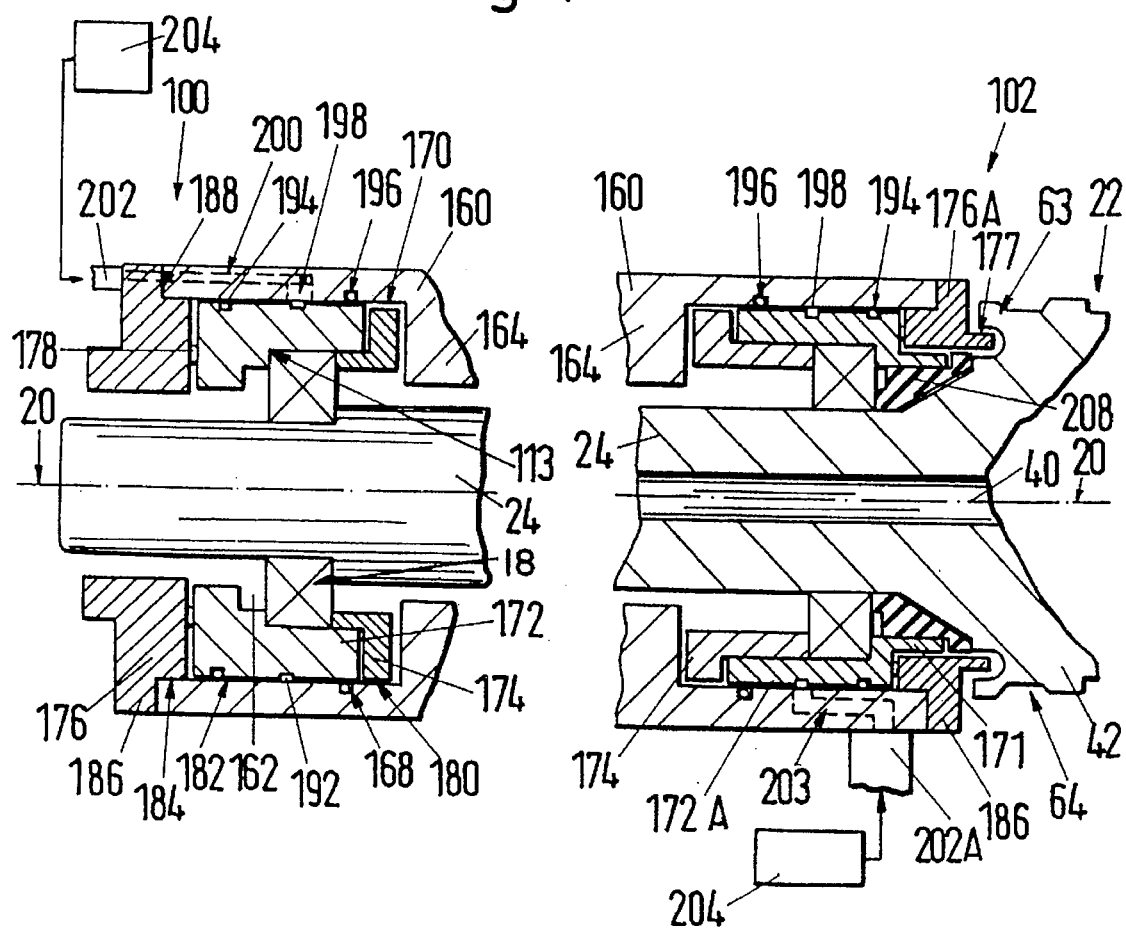
FIG. 4 illustrates a part cross sectional view of a chuck constructed in accordance with the invention.

FIG. 4 shows the two end sections of a fixing device for a chuck similar to the fixing device explained in the FIGS. 1 to 3. The interposed central portion of the fixing device is not linked in any way to the present invention and shall therefore not be shown and explained any further. The end section 100 (FIG. 4) is equivalent to the left end of the arrangement in accordance with FIG. 2 and the end section 102 (FIG. 4) is equivalent to the right end of the arrangement of FIG. 2.

The parts of the modifications in accordance with FIGS. 1 to 3 and 4 to 6 which are substantially the same shall be marked with the same reference numerals.

The encasing is marked in FIG. 4 with the reference numeral 160; this is substantially equivalent to the support casing 16 of FIG. 2, whereby changes were made in the end sections for adaptation to the invention, which shall be explained below.

In the end section 100 a hollow chamber 162 is formed by an inwardly projecting flange 164. The hollow chamber 162 is provided with a substantially even round cross section over the major portion of its length from the flange 164 to the end of encasing 160, with a groove 168 being milled into the cylindrical inner surface 170 of the encasing 160 to receive an O-ring 96.

The hollow chamber 162 receives a bearing unit, which comprises—among other things—the following elements (also see FIG. 5):

a) a bearing bush consisting of an annular carrier 172 and a ring 174 with an L-shaped cross section, b) a lid element 176, c) a ball bearing 18, which is held between a shoulder 113 in carrier 172 and a leg of the L-shaped ring 174, and d) spring pins 18 which connect the lid element 176 with the carrier 172 of the bearing bush.

Ring 174, the carrier 172 and the lid element 176 are each provided with an outer cylindrical surface 180, 182, 184 which is situated in the hollow chamber 162 after the reception of the bearing unit, namely either in contact with or at a small distance from the inner surface 170 of the encasing 160. The lid element 176 is also provided with an outwardly projecting flange 186 which is attached by screws (not shown) to the front surface 188 of the end section 100. Ring 174 is also attached with screws (not shown) to carrier 172, so that by mounting the lid element 176 in contact with the front surface 188, all parts of the bearing unit are positioned with respect to the hollow chamber 162.

Two grooves 190, 192 are milled into the outer surface 182 of carrier 172. The one groove 190 receives an O-ring 194, which axially limits in cooperation with the O-ring 196 received in the groove 168 of the encasing 160 a narrow annular space (not provided with a reference numeral) between the outer surface 182 and the carrier 172 and the inner surface 170 of the encasing 160. The second groove 192 opens towards this space and is in connection with the front surface 188 via bores 198, 200. The bore 200 opens into a respective opening, (not marked with a respective reference numeral) in flange 186, which enables a connection with an oil supply means 202. During operation the latter means is in connection with a source 204 of oil acting as a damping liquid, which can be supplied via bores 200, 198 to the annular space so as to form therein an oil film. An oil film of approx. 0.1 to 0.2 mm thickness (preferably 0.1 to 0.15 mm) has proved to be preferable.

As was already mentioned above, the lid element 176 and the carrier 172 are mutually connected via spring pins 178, namely in such a way that they are centered with respect to one another (each on the axis of rotation 20), so that a small gap A (FIG. 5) is maintained between the opposed face sides of the parts 172, 176. The spring pins 178 thus serve as a centering means to center a carrier 172 within the encasing 160.

The spring pins 178 are pressed into the respective bores in the lid element 176 and the carrier 172. Every bore in carrier 172 is provided with a part 206 (FIG. 5) which has a larger cross section than the received spring pin 178 and opens towards the annular gap. Owing to the spring pins 178 the centering must also be ensured after the mounting in such a way that the "sagging of the chuck" is prevented or kept within reasonable limits. The pins can be made from steel.

At the left end of the end section 100 the axle 24 is connected to drive elements, as was shown in FIG. 2. These elements are not shown in FIG. 4, as they have nothing to do with the present invention.

The end section 102 is substantially similar to end section 100 and, as far as possible, the same reference numerals were used for marking the same parts. The arrangement of end section 102 will thus be clear for the main part without having to repeat the above description, so that only some small deviations shall be explained below. The lid element 176A is provided in this case with a projection 177 which projects into the annular space at the end of chuck portion 22. A yarn which jumps over the projection 63 is caught on projection 177. Between a cylindrical part 171 of the carrier 172A and the taper of chuck portion 22, there is situated a packing ring 208. The oil supply 202A supplies damping liquid not via an opening in flange 186 of the lid element 176A, but through a bore 203 directly into the encasing 160.

The spooling machine is preferably provided with its own source 204 its damping liquid. The pressure of some bar must be maintained in this source for security purposes. A pressure or level monitoring means (not shown) may be provided and connected to the machine control unit so that an alarm is generated or the machine is switched off when the monitoring means reports a faulty condition. It is not necessary under all circumstances to connect the oil source 204 continuously with the annular space. The supply line 202 or 202A may be provided with a self-closing valve (not shown) so that the oil source 204 can be coupled off after the "filling" of the space. In this case, it is necessary to connect the pressure monitoring means with the supply line 202, 202A instead of with the source 204. A normal "life" for the filled system can be defined, so that the damping liquid is periodically replenished during the usual maintenance of the machine.

FIG. 7 shows an alternative solution. The shaft is indicated here with 300 and the bearing with 302. The encasing is indicated with 304. Between the bearing 302 and the encasing 304 there is provided a hollow ring 306 which is filled with damping liquid under high pressure and which is hermetically sealed. The inner and outer walls 308 and 310 are connected to the bearing or casing. The side walls 312 and 314 each form a spring element which centers the shaft 300 with respect to the encasing 304, but which enables a transmission of oscillations onto the damping liquid. As shown, each side wall 308, 310 is of V-shape.

The resilient walls 308, 310 usually guide the bearing 302 concentrically with the axis of rotation 20. When there is a radial deflection of the shaft part 300, the cross section of ring 306 is "squashed" at one position and expanded at the diametrically opposed place. The damping liquid accordingly tries to flow in the circumferential direction from the area with relatively high pressure to the zone of relatively low pressure. At least during unsteady oscillations (beats) the pressure conditions in the interior of the hollow ring 306 are subjected to continuously changing forces, so that the liquid may offer resistance to the deflection.

The whole damping hollow ring 306 can be replaced after a predefined service life.

The invention is not limited to the application in a fixing device for the chuck. It can be used for coping with resonance problems in many areas of a spooling machine, e.g., also in the suspension of a contact roller (see U.S. Pat. No. 4,548,366 and EP-A-94 483, for example) or in the carrier of a traversing unit (see U.S. Pat. No. 5,048,769 and EP-A-272 458, for example).

The invention not only enables an expansion of the field of application from the chuck to a higher speed range, but also in lower speed ranges where dangerous oscillations (without the damping) are to be expected at the first critical speed.

We claim:

1. A chuck for a spooling machine comprising a casing;

a rotatable load bearing element having a first part disposed in said casing and a second part extending from said casing in cantilevered relation to receive at least one bobbin tube therein;

a pair of bearings rotatably supporting said first part of said load bearing element in said casing;

a pair of annular carriers, each carrier supporting a respective bearing therein and being spaced from said casing to define an annular gap therebetween:

a pair of lid elements, each lid element being secured to said casing in spaced relation to a respective carrier:

a plurality of spring pins secured to and between each said carrier and each said lid for centering said bearings in said casing to maintain said annular gap between each carrier and said casing and to transmit oscillations from said load bearing element to said casing; and damping means in said gap between each carrier and said casing to damp oscillations transmitted from said load bearing element to said casing.

2. A chuck as set forth in claim 1 wherein said load bearing element is an axle.

3. A chuck as set forth in claim 1 wherein said damping means is a hydraulic damping means.

4. A chuck as set forth in claim 1 wherein each bearing is mounted at a respective end of said casing.

5. A chuck as set forth in claim 1 wherein said damping means is a film of liquid disposed between each carrier and said casing.

6. A chuck as set forth in claim 1 wherein said damping means includes a damping liquid source for supplying liquid to each gap between a respective carrier and said casing.

7. A chuck as set forth in claim 1 which further comprises a pair of O-rings between each carrier and said casing to define an annular space in each gap to maintain damping liquid therein.

\* \* \* \* \*

UNITED STATES PATENT AND TRADEMARK OFFICE
CERTIFICATE OF CORRECTION

PATENT NO. : 5,649,670
DATED : July 22, 1997
INVENTOR(S) : Armin Witz, et. al.

It is certified that error appears in the above-indentified patent and that said Letters Patent is hereby corrected as shown below:

Column 2, line 28, change "Of" to -of-

Line 37, change "Specified" to -specified-

Column 5, line 41, change "its" to -of-

Signed and Sealed this

Twenty-first Day of October 1997

Attest:

BRUCE LEHMAN

Attesting Officer

Commissioner of Patents and Trademarks